(12) United States Patent
Jung et al.

(10) Patent No.: US 9,868,438 B2
(45) Date of Patent: Jan. 16, 2018

(54) DAMPING OF PITCHING OSCILLATIONS OF A WORKING VEHICLE BY CHANGING THE SPEED

(71) Applicant: DEERE & COMPANY, Moline, IL (US)

(72) Inventors: Benedikt Jung, Kaiserslautern (DE); Guenther Wolf, Worms (DE); Philipp Muench, Kaiserslautern (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/079,272

(22) Filed: Mar. 24, 2016

(65) Prior Publication Data

US 2016/0280221 A1 Sep. 29, 2016

(30) Foreign Application Priority Data

Mar. 26, 2015 (DE) ........................ 10 2015 205 509

(51) Int. Cl.
*B60W 30/18* (2012.01)
*A01D 41/127* (2006.01)
*B60W 30/02* (2012.01)
*A01D 41/14* (2006.01)
*E02F 9/22* (2006.01)
*A01B 76/00* (2006.01)

(52) U.S. Cl.
CPC ............. *B60W 30/02* (2013.01); *A01B 76/00* (2013.01); *A01D 41/127* (2013.01); *A01D 41/141* (2013.01); *E02F 9/2207* (2013.01); *B60G 2300/08* (2013.01)

(58) Field of Classification Search
CPC ...... B60W 30/02; A01B 76/00; A01D 41/127; A01D 41/141; E02F 9/2207; B60G 2300/08
See application file for complete search history.

(56) References Cited

U.S. PATENT DOCUMENTS

2006/0009897 A1\* 1/2006 Schick .................. F02D 41/021
701/50
2013/0292144 A1\* 11/2013 Zhu ......................... E02F 3/841
172/2

FOREIGN PATENT DOCUMENTS

| DE | 3446811 A1 | 7/1986 |
| DE | 102010017459 A1 | 12/2011 |
| DE | 102013213588 A1 | 1/2015 |
| DE | 102014203005 B3 | 5/2015 |
| DE | 102014208070 A1 | 12/2015 |

\* cited by examiner

Primary Examiner — Michael J Zanelli

(57) ABSTRACT

An arrangement for damping a possible pitching oscillation of a working vehicle supported on the ground by elastic elements is equipped with means to detect an expected and/or existing pitching oscillation of the working vehicle, and a control device, which is connected to the means and to an actuator to influence the propulsion rate of the working vehicle and which can be operated to control the actuator so as to damp the pitching oscillation.

6 Claims, 2 Drawing Sheets

DAMPING OF PITCHING OSCILLATIONS OF A WORKING VEHICLE BY CHANGING THE SPEED

CROSS-REFERENCE TO RELATED APPLICATIONS

Pursuant to 35 USC §119, this application claims the benefit of and priority to German patent application no. 102015205509.4, filed on 26 Mar. 2015, which is herein incorporated by reference in its entirety.

TECHNICAL FIELD

The invention relates to an arrangement for damping a possible pitching oscillation of a working vehicle supported by elastic elements on the ground, using means for detecting an expected or existing pitching oscillation of the working vehicle, and a control device, which is connected to the means for detecting an expected or existing pitching oscillation of the working vehicle and to an actuator, and can be operated to control the actuator so as to damp the pitching oscillation, and further relates to an agricultural working vehicle having such an arrangement.

BACKGROUND

As a rule, agricultural vehicles or other working vehicles comprise elements that can be adjusted, i.e., moved linearly or swiveled, with respect to the working vehicle by associated actuators. Such elements include, for a tractor, an implement placed on a front or rear power lift of a tractor, for soil cultivation, for sowing, or for spreading fertilizers or other chemicals for example; for a self-propelled field sprayer, a height-adjustable sprayer boom and/or one that can swivel about an axis extending in the forward direction; for a combine harvester or a forage harvester, a harvesting attachment which, for height adjustment, can swivel around a horizontal axis, transversely oriented toward the forward direction (as a rule, the rotational axis of an upper inclined conveyor roller or cutter head) and/or for parallel orientation on a slope, about an axis that extends in the forward direction, or for height adjustment of its discharge end, a spout of a forage harvester that can be adjusted in height about a horizontal axis and/or can be adjusted in height about the vertical axis. The target position of the actuator and thus the adjustable element is specified by an operator via a suitable interface or by an automatic control device, working together with sensors.

Since, as a rule, the working vehicle is supported by air-filled (and thus elastically flexible) tires on the ground and/or can be provided with a suspension between the wheels or track roller units and the body of the working vehicle, the system consisting of the adjustable element and the working vehicle is excited to a pitching oscillation (pitch) with every adjustment of the actuator; this can have a disturbing effect during operation. Thus, cutting mechanisms can have a width of 12 m or more, and if they are guided in heights of a few cm over the ground, a desired cutting height can occasionally not be maintained due to the vibration arising from a height adjustment. Furthermore, the working vehicle is excited to pitching oscillations as a result of the flexible tires and/or the suspension, if the working vehicle changes its travelling speed, automatically or via an operator input, or if it travels over bumps. Rolling oscillations in a lateral direction are also possible, if, for example, wheels on only one side travel over bumps.

For damping such pitching oscillations on a tractor with a hinged plow, the proposal was made that during road travel, the raised plow be actively damped by detecting force changes caused by pitching oscillations, using sensors for the load of the front axle, the traction, or the pressure in a hydraulic cylinder (DE 34 46 811 A1). The pitching oscillation of the system consisting of a plow and tractor is accordingly damped by a suitable height adjustment of the plow, which counteracts the vibration. In a similar manner, a proposal is made in DE 10 2010 017 459 A1 that any vibrations of a spout of a forage harvester be detected with a sensor for detecting the position of the spout relative the forage harvester, or the pressure in the hydraulic cylinder used for height adjustment of the spout, in order to detect pitching oscillations of the forage harvester and to control the hydraulic cylinder contrary to the vibration if necessary.

Furthermore, in the prior art, there are known control circuits that are equipped with a sensor for detecting the respective position of the adjustable element; their signal is used to feed back the actual position of the element to a control circuit (see, for example US 2009/0277145 A1 for a height adjustment of a harvesting attachment of a combine harvester). In this way, any deviations of the element from its target position, caused, among other things, by the pitching oscillation of the working vehicle, are detected and fed back to the control circuit in order to keep the harvesting attachment in its desired height above the ground, but any pitching oscillations of the system consisting of the harvesting machine and the harvesting attachment are not systematically damped.

Accordingly it is known from the prior art, especially from DE 34 46 811 A1, that any pitching oscillations of a system consisting of a working vehicle and an element that can undergo a height adjustment relative to the vehicle can be damped by means of a suitable height adjustment of the adjustable element. Such a procedure, however, encounters limits when the position of the element is to remain with a defined range during operation, for example, if the height-adjustable element is a harvesting attachment that is not to penetrate into the soil or cut above the ears, or if a specific plow depth is to be maintained.

SUMMARY

The problem addressed by the present invention is that of providing an arrangement for damping a possible pitching oscillation of a working vehicle, in which the aforementioned disadvantages are avoided or reduced.

The present invention is defined by the claims.

An arrangement for damping a possible pitching oscillation of a working vehicle supported by elastic elements on the ground comprises means for detecting an expected and/or an existing pitching oscillation of the working vehicle, and a control device that is connected to the means and to an actuator designed to influence the propulsion rate of the working vehicle, and which can operate to control the actuator so as to damp the pitching oscillation.

If the working vehicle, for example, is accelerated, then as a result of the suspension of the elastic elements, which can be pneumatic wheels and/or additional suspensions, the working vehicle can first incline to the back and then again oscillate to the front, and then, with temporally declining amplitude, again incline to the back and then again to the front. Analogously, when braking, the working vehicle will incline forward and, subsequently, will incline backward. Such pitching oscillations can also arise when moving over an unevenness of the ground or during height adjustment of an element of the working vehicle. These pitching oscillations have, among other things, disadvantageous effects on a height of an element placed on the working vehicle, which is to be maintained as constant as possible, such as a harvesting attachment, and on the comfort of an operator sitting on or in the working vehicle. The proposal is made to detect, by suitable means, an expected and/or existing oscillation motion of the working vehicle and, by means of the control device, to control an actuator that controls the propulsion rate of the working vehicle so as to damp the pitching oscillation. In this way, for example, the working vehicle can be slightly accelerated, if it just inclines forward, so as to finally attain a precise horizontal orientation of the working vehicle and to reduce or destroy the energy of the pitching oscillation. Analogously, the working vehicle can be slightly decelerated if it inclines backward. The present invention thus enables a simple and effective damping of the pitching oscillations of working vehicles.

As mentioned, the arrangement comprises means for detecting an expected and/or existing oscillation motion of the working vehicle; that is, it can be designed as an open-loop control system if an expected oscillating motion is detected, and as a closed-loop control system when an existing oscillating motion is detected.

An existing oscillation motion can be detected with an inertial sensor and/or a pressure sensor, which detects the pressure in a fluid actuator used for adjusting a movable element placed on the working vehicle. It is thus detected if the working vehicle (relative to the ground) carries out a pitching oscillation and the oscillation is damped, at least in part, by changing the speed of the working vehicle.

An expected pitching oscillation of the working vehicle can, on the other hand, be detected with the aid of signals of a speed control of the working vehicle, since the acceleration and deceleration of the working vehicle results in the pitching oscillation described in the preceding paragraph. An expected pitching oscillation can also be detected with the aid of a ground profile determination device or with the aid of a control device for adjusting an element relative to the working vehicle, which can also produce a pitching oscillation. Thus, the amplitude and phase of an expected pitching oscillation are evaluated and the actuator is correspondingly controlled (anticipatorily, in a system with an open or closed control loop), so as to counteract the pitching oscillation.

Here it is possible, in particular, to use the procedure described in DE 10 2014 203 005 B3 and the prior art cited there, the disclosure of which is hereby incorporated by reference into the present documents. In such an embodiment, a signal shaper receives a speed specification signal from an operator or an automatic system. If this specifies an abrupt change of the target speed, the signal shaper passes it on, initially 1:1, to the actuator (for example, a hydrostatic transmission) for the propulsion rate of the working vehicle. After a certain time, which the working machine requires for half of a pitching oscillation period, the signal shaper then gives a second command to the actuator, which corresponds to an additional speed change. If the working machine is accordingly accelerated abruptly, there is a second acceleration after the first acceleration if the machine again inclines forward.

The control device can also be connected to a second actuator for adjusting an element relative to the working vehicle, and can be operated so as to control the second actuator, in order to maintain a target position of the element and/or damp the pitching oscillation. The control device can control both the first actuator, used to influence the propulsion rate, and the second actuator, in separate control circuits or in a multi-value controller.

BRIEF DESCRIPTION OF THE DRAWINGS

The drawings show two embodiment examples of the invention, described in more detail below, wherein the reference symbols should not be used for a limiting interpretation of the claims. The brief description of the drawings refers to the accompanying figures in which:

DETAILED DESCRIPTION OF THE DRAWINGS

Figure 1:
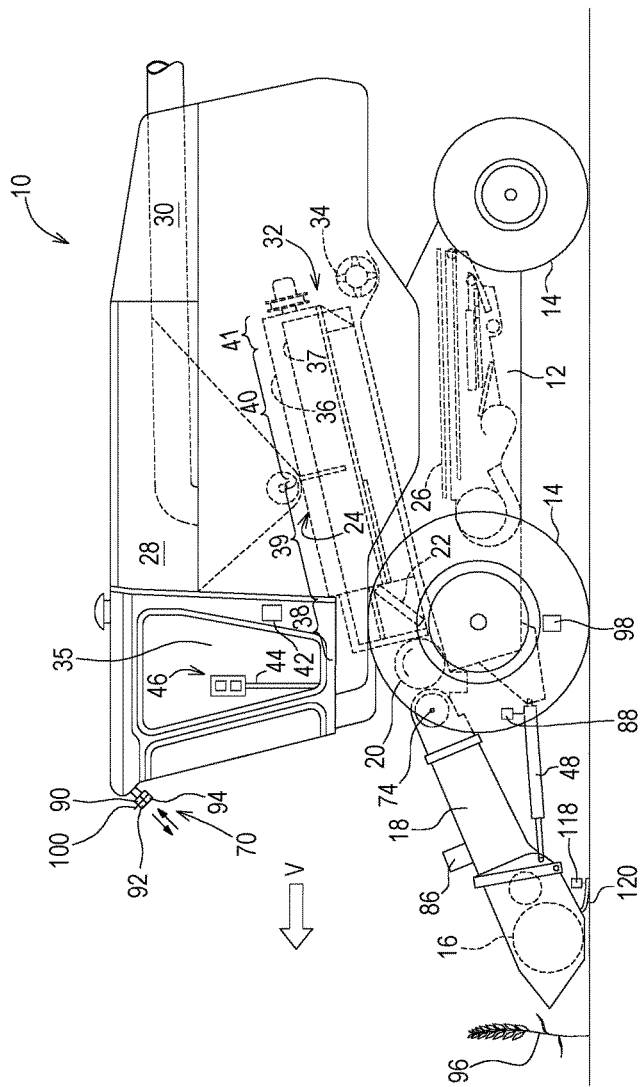
FIG. 1 schematically illustrates a side view of a working vehicle with an adjustable element.

FIG. 1 illustrates a self-propelled agricultural working vehicle 10 in the form of a combine harvester with a carrying structure 12, which is equipped with wheels 14 that engage with the ground. Although the working vehicle 10 is shown with wheels, it could also be equipped with two or four track roller units. A harvesting attachment 16 in the form of a cutting mechanism is used for harvesting crops and supplies them to an inclined conveyor 18. The inclined conveyor 18 contains a conveyor device in order to supply the harvested crops to a conducting drum 20. The conducting drum 20 conducts the crops upward through an inlet transition section 22 and to a rotatable crop processing device 24, set up for threshing and separating. The crop processing device 24 shown is axially arranged in the combine harvester; however, it could also be located in other relative orientations, relative to the longitudinal axis of the working vehicle 10.

During operation, the crop processing device 24 threshes and separates the harvested crops. The grain and chaff fall through grates on the bottom of the crop processing device 24 into a cleaning system 26. The cleaning system 26 removes the chaff and conducts the clean grain to an elevator (not shown) for clean grain. The elevator for clean grain deposits the grain in a grain tank 28. The clean grain in the grain tank 28 can be conducted through a discharging screw conveyor 30 to a truck or trailer.

Threshed chaff, freed from the grain, is conducted by the crop processing device 24 though an outlet 32 to a discharge drum 34. The discharge drum 34 expels the chaff, in turn, at the rear end of the working vehicle 10. It should be noted that the discharge drum 34 could also conduct the material freed from the grain directly to a straw chopper. The operation of the working vehicle 10 is controlled from an operator's cabin 35.

The crop processing device 24 comprises a cylindrical rotor housing 36 and a rotatable rotor 37 located in the rotor housing 36. The front part of the rotor 37 and the rotor housing 36 define an infeed section 38. Downstream from the infeed section 38, there are a threshing section 39, a separating section 40, and an outlet section 41. The rotor 37 is equipped with a conical rotor drum in the infeed section 38, which has helically formed infeed elements for engagement with the material that it obtains from the conducting drum 20 and from the inlet transition area 22. Directly downstream from the infeed section 38, there is the threshing section 39. In the threshing section 39, the rotor 37 has a cylindrical rotor drum that is equipped with a number of threshing elements so as to thresh the material obtained from the infeed section 38. Downstream from the threshing section 39, there is the separating section 40, in which the grain still contained in the threshed material is freed and then falls through a bottom grate in the rotor housing 36 into the cleaning system 28. The separating section 40 transitions into the outlet section 41, in which the material (straw) freed from the grain is expelled from the crop processing device 24.

The height control of the harvesting attachment 16, which is used in the embodiment under consideration as an example of an adjustable element of the working vehicle 10, is carried out with an actuator 48, in the form of a hydraulic cylinder, which adjusts the inclined conveyor 18, with the harvesting attachment 16 affixed to it, about the rotational axis of the upper deflection roller 74 of the inclined conveyor 18, oriented transverse to the forward direction V and horizontally, and thus defines the space between the harvesting attachment 16 and the ground. The actuator 48 is controlled by means of a control device 42. The desired (target) height of the harvesting attachment 16 is specified by means of an operator interface 46 with keys that are located on the upper end of a drive lever 44, which is hinged such that it can swivel and is used to specify the propulsion rate of the working vehicle 10. In addition, an anticipatory sensor system 70 with a radar transmitter 92, a radar receiver 94, and an evaluation unit 90 is installed on the roof of the cabin 35, wherein the radar transmitter 92 and the radar receiver 94 swivel back and forth about an axis 100, so as to scan the contour of the field ahead of the working vehicle 10, using rays which penetrate the plants 96, and to obtain anticipatory values for the control device 42. A height sensor 118, working together with a ground sensor 120, also detects the actual height of the harvesting attachment 16 above the ground. The sensor system 70 and the height sensor 118 are required for the automatic height adjustment of the harvesting attachment 16 and are not absolutely necessary for the speed regulation described further below.

When the position and situation of the harvesting attachment 16 (for example, raising and lowering, and in another embodiment, lateral tilting also) is modified in the prior art, excitation torques and excitation forces arise upon changes of the target position values of the harvesting attachment 16, which are transmitted to the working vehicle 10 supported on large-volume tires, which is supported on the ground by elastic elements (namely, the tires). As a result of the large-volume tires, the system consisting of the working vehicle 10 with the harvesting attachment 16 is excited here to produce mechanical vibrations, which negatively influence the accuracy of the height position and the tilting of the harvesting attachment 16 relative to the ground. Depending on the type of excitation forces and torques, the harvesting machine-attachment unit is excited with vibrations with a different frequency, damping, and amplitude. To a particular extent, resonance frequencies of the harvesting machine-attachment unit are also excited, so that strong natural vibrations can arise. These vibrations are contrary to the goal of a constant cutting height of the crops and worsen the result of the attachment height control. The aforementioned vibrations result in the working vehicle 10 with the harvesting attachment 16 inclining forward and backward, that is, carrying out pitching oscillations.

Such pitching oscillations arise also if the propulsion rate of the working vehicle 10 is changed by a manual adjustment of the drive lever 44 by the operator or by an automatic system that strives to maintain constant throughput through the working machine 10, or if the working vehicle 10 moves over an unevenness of the ground. In working vehicles with (hydraulically or mechanically) suspended wheels or track roller units, similar pitching oscillations can arise, even if the means directly engaged with the ground, that is, in particular, track roller units, are only slightly suspended or are not suspended at all.

Figure 2:
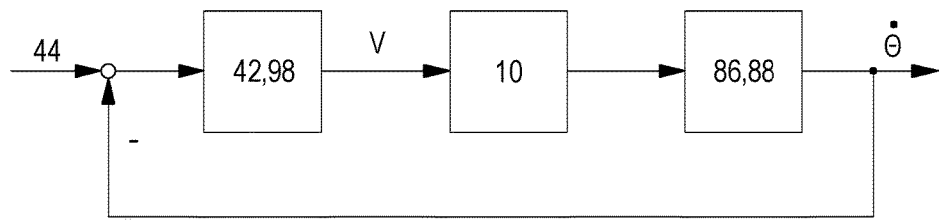
FIG. 2 schematically illustrates a first embodiment of an arrangement for the pitching oscillation-damping control of the propulsion rate and the height of the harvesting attachment of the working vehicle from FIG. 1.
Figure 2:
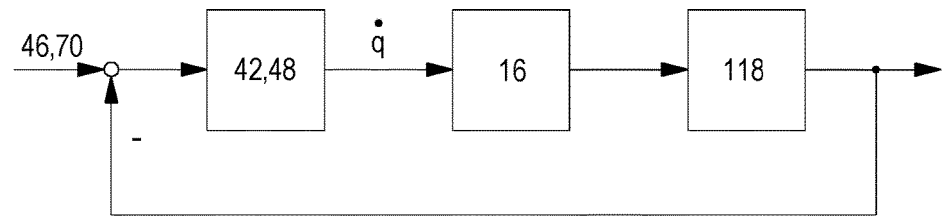

FIG. 2 illustrates a first embodiment of an arrangement for damping such a possible pitching oscillation. In the upper part of FIG. 2, a control circuit is shown, in which the output signal of the drive lever 44 (or an automatic system for speed specification mentioned in the preceding paragraph) is used as the input signal. After the deduction of a control variable, described further below, the signal is supplied to a control device 42 that, in turn, controls the transmission ratio of an actuator 98, which drives the front wheels 14. A hydrostatic drive is used as the actuator 98 to influence the propulsion rate of the working vehicle 10. The system of the working machine 10 and the harvesting attachment 16, therefore, moves at a specific speed, which is possibly accelerated or decelerated. The speed changes lead to the described pitching oscillations. The control device 42 is connected to a sensor 86, which may be a vibration, acceleration, or inertial sensor and which is located on the inclined conveyor 18. Furthermore, the control device 42 is connected to a pressure sensor 88, which detects the pressure in the piston chamber of the actuator 48. With the aid of the signals of the sensor 86 and the pressure sensor 88, the control device 42 evaluates the rate of change $\delta\Theta/\delta t$, indicated as $\dot\theta$ in the FIG. 2, of the angle of inclination of the working vehicle 10 and/or the harvesting attachment 16 in the forward direction. This rate of change is deducted, as a control variable, from the input variable of the control circuit. Thus, the propulsion rate of the working vehicle is controlled by the control device 42, in order to damp a pitching oscillation. Here, the sensor 86 and the pressure sensor 88 are used as means for detecting an existing pitching oscillation.

Furthermore, the control device 42 according to FIG. 2 comprises another control circuit, depicted below, to which the cutting height is supplied as an input variable, which is specified by means of the operator interface 46 or the sensor system 70. After the deduction of a control variable, the input signal is supplied to the control device 42, which (via valves and pump, not shown) controls a flow rate $\delta q/\delta t$, indicated as $\dot q$ in FIG. 2, of the hydraulic fluid for the actuator 48. The resulting height of the harvesting attachment 16 is detected by means of the height sensor 118 and is deducted, as a control variable, from the input variable of the control circuit. The lower part of FIG. 2 is a conventional control circuit for adjusting the height of the harvesting attachment 16.

Figure 3:
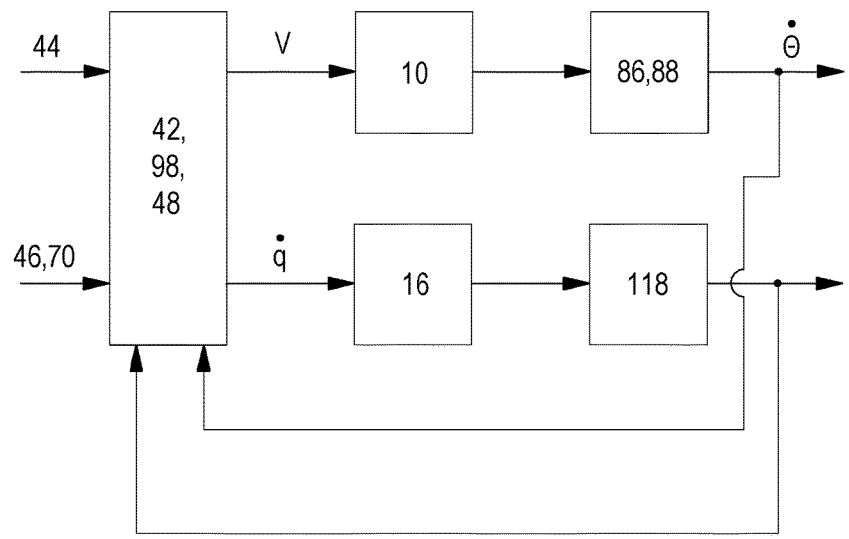
FIG. 3 schematically illustrates a second embodiment of an arrangement for the pitching oscillation-damping control of the propulsion rate and the height of the harvesting attachment of the working vehicle from FIG. 1.

As shown in FIG. 3, the two control circuits of FIG. 2 can also be combined in one multi-value controller. This multi-value controller is implemented by the control device 42, which receives, as input variables, the target speed and the target height of the harvesting attachment 16, and, as output variables, controls, via the actuator 98, the propulsion rate of the working vehicle 10 and, via the actuator 48, the height of the harvesting attachment 16. The rate of change $\delta\Theta/\delta t$, indicated as $\dot\theta$ in the FIG. 2, of the angle of inclination of the working vehicle 10 and/or the harvesting attachment 16 in the forward direction is detected by means of the sensor 86 and/or the pressure sensor 88 and is fed back to the control device 42, as well as the actual height of the harvesting attachment 16 above the ground, detected with the height sensor 118.

In the embodiment according to FIG. 3, there is the possibility that expected pitching oscillations, which are caused by a height adjustment of the harvesting attachment 16, are input into the speed control in an anticipatory manner, so as to damp or cancel them. Thus, during the raising of the harvesting attachment 16, it can be anticipated that the working vehicle 10 will incline forward, which can be compensated for by an acceleration. Analogously, during the lowering of the harvesting attachment 16, one should thus take into account that the working vehicle 10 will incline backward, which can be compensated for by a deceleration. The height specification signal for the harvesting attachment 16 at the input of the control device 42 is then used as the means for detecting an expected pitching oscillation of the working vehicle 10.

The effects of expected speed changes on the height control can be taken into consideration in an analogous manner: if the working vehicle 10 is accelerated, the harvesting attachment 16 is moved upward, which can be compensated for by lowering the harvesting attachment 16 by the control device 42 and the actuator 48. If the working vehicle 10 is decelerated, then the harvesting attachment 16 will be lowered, which can be compensated for by a raising via the control device 42 and the actuator 48.

Other refinements are possible within the scope of the idea that is the basis of the invention. Thus, the signal to the actuator 48 for the height control of the harvesting attachment, in accordance with the disclosure of DE 10 2014 203 005 B3, the disclosure of which is incorporated by reference in the present documents under consideration, can be overlaid with a time-delayed, phase-shifted signal, so as to damp the vibrations arising during the adjustment of the harvesting attachment. The procedure disclosed there is also possible in the control of the propulsion rate, that is, after one acceleration, another acceleration takes place (if the harvesting machine inclines forward after a certain period of time) and/or a deceleration (if the harvesting machine inclines backward), in order to damp the pitching oscillation as quickly as possible. The speed specification signal at the input of the control device 42 is then used as an means for detecting an expected pitching oscillation of the working vehicle 10. The control device 42 would then comprise a signal shaper (not shown), which can be operated to forward a received speed specification signal and, in a time-delayed manner, to give a second speed specification signal to the actuator, as described in detail in the aforementioned patent document and the prior art mentioned therein.

In such a height control of the harvesting attachment 16 and/or the speed control, the adjustment signals to be overlaid can be adapted to the resonance frequencies and damping factors of the harvesting machine-attachment unit and thus also to a wide variety of attachment-harvesting machine combinations and varying tire and ground parameters. The measurements needed for the purpose are delivered by the pressure sensor 88 in the case of a hydraulic cylinder 48 working as an actuator. Furthermore, damping factors and resonance frequencies can also be determined by the sensor 86.

With the height control of the harvesting attachment 16 and with the vibration-absorbing speed control, the ground profile in front of the harvesting machine and its interaction with the tires can also be taken into consideration, as is described in DE 10 2014 208 070 A1, the disclosure if which is also incorporated by reference into the present document.

The control device 42 of FIG. 3 then receives two input variables (the target speed of the working vehicle 10 and the target height of the harvesting attachment 16) and two adjustment variables (the drive 98 and the actuator 48), wherein both input variables influence both adjustment variables, whose effects, moreover, influence one another, directly or indirectly. In the controller 42, optimization methods, which, for example, minimize the needed drive energy for the propulsion of the working machine 10 and the adjustment energy required for the adjustment of the actuators 48, 98, can be advantageously used in order to obtain, while using as little energy as possible, a good damping result and as good a maintenance of the cutting height as possible. Moreover, by using passive and semi-active hydraulic components, such as (pneumatic) hydraulic accumulators (see, for example, DE 10 2013 213 588 A1, the disclosure of is incorporated by reference into the present documents) or components with magneto-rheological fluids, the required use of energy can be further reduced.

In another embodiment, the adjustable element is an implement placed on a front or rear power lift of a tractor, or a height-adjustable sprayer boom of a self-propelled field sprayer, which can swivel about an axis extending in the forward direction, or a spout of a forage harvester, which can be adjusted about a vertical and/or horizontal axis.

What is claimed is:

1. An arrangement for dampening a pitching oscillation of a working vehicle supported on the ground by elastic elements, said arrangement comprising:
   at least one sensor for detecting at least one of:
   an expected pitching oscillation of the working vehicle, the at least one sensor coupled to at least one of a speed control of the working vehicle, a ground profile determination device or a control device for adjusting the elastic elements relative to the working vehicle, or
   an existing pitching oscillation of the working vehicle; and
   an actuator for influencing the propulsion rate of the working vehicle; and
   a control device connected to the at least one sensor and the actuator to control dampening of the pitching oscillation, wherein the control device comprises a signal shaper, operable to transmit a received speed specification signal to the actuator and to issue, in a time-delayed manner, a second speed specification signal to the actuator.

2. The arrangement according to claim 1, wherein the at least one sensor for detecting the existing pitching oscillation, the at least one sensor comprises an inertial sensor or a pressure sensor, or combinations thereof, which detects the pressure in the fluid actuator that is used for adjusting the elastic elements that is mounted movably on the working vehicle.

3. The arrangement according to claim 1, wherein the control device is operable to control the actuator bar accelerating the working vehicle, if the working vehicle inclines forward; or decelerating the working vehicle, if the working vehicle inclines backward.

4. The arrangement according to claim 1, wherein the control device cooperates with a second actuator for adjusting the elastic elements relative to the working vehicle, to maintain a target position of the elastic elements for dampening the pitching oscillation.

5. The arrangement according to claim 4, wherein the control device controls the first actuator to influence the propulsion rate of the working vehicle, and the second actuator via discreet control circuits or a multi-value controller.

6. The arrangement according to claim 1, wherein the arrangement is part of an agricultural working vehicle.

\* \* \* \* \*